(12) United States Patent
Boecker et al.

(10) Patent No.: US 7,565,560 B2
(45) Date of Patent: Jul. 21, 2009

(54) SUPPLYING COMBINATIONS OF CLOCK FREQUENCY, VOLTAGE, AND CURRENT TO PROCESSORS

(75) Inventors: Douglas Michael Boecker, Rochester, MN (US); Patrick Kevin Egan, Rochester, MN (US); Todd Jon Rosedahl, Zumbrota, MN (US); Jeffrey Scot Rotter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 11/554,634

(22) Filed: Oct. 31, 2006

(65) Prior Publication Data
US 2008/0104423 A1   May 1, 2008

(51) Int. Cl.
G06F 1/26  (2006.01)
(52) U.S. Cl. .................. 713/320; 713/300; 713/310; 713/321; 713/322; 713/323; 713/324; 713/330; 713/340
(58) Field of Classification Search .............. 713/300, 713/310, 320–324, 330, 340
See application file for complete search history.

(56) References Cited

U.S. PATENT DOCUMENTS

| | | | | |
|---|---|---|---|---|
| 5,033,112 A * | 7/1991 | Bowling et al. | ............. | 398/110 |
| 5,996,083 A * | 11/1999 | Gupta et al. | ................. | 713/322 |
| 6,754,837 B1 * | 6/2004 | Helms | .......................... | 713/322 |
| 6,826,705 B2 * | 11/2004 | Tani | ............................. | 713/320 |
| 7,149,905 B2 * | 12/2006 | Brown et al. | ................. | 713/300 |
| 7,219,245 B1 * | 5/2007 | Raghuvanshi | ............... | 713/322 |
| 7,249,268 B2 * | 7/2007 | Bhandarkar | ................. | 713/320 |
| 7,472,297 B2 * | 12/2008 | Capps et al. | ................ | 713/320 |
| 2002/0087896 A1 * | 7/2002 | Cline et al. | .................. | 713/300 |

* cited by examiner

Primary Examiner—Abdelmoniem Elamin
(74) Attorney, Agent, or Firm—Owen J. Gamon (57) ABSTRACT

Combinations of clock frequencies, voltages, and currents at which a processor operates normally are determined. These combinations are stored to a component on which the processor is installed. Voltage identifiers are stored to a computer system in which the component is installed. The voltage identifiers are associated with combinations of the voltages and currents. A type of the computer system is also stored to the component. A first clock frequency at which the processor operates is determined that is assigned to the type of the computer system. A first voltage and a first current are selected that are assigned to the first clock frequency. A first voltage identifier is found that is assigned to the combination of the first voltage and first current, and the first voltage identifier is sent to a voltage regulator, which supplies voltage to the processor.

20 Claims, 7 Drawing Sheets

PROCESSOR CHARACTERIZATION DATABASE 190

| PROCESSOR ID (325) | FREQUENCY (330) | VOLTAGE (335) | CURRENT (340) |
|---|---|---|---|
| 001 | 1500<br>1900 | 1100<br>1320 | 88<br>124 | ⟵ 315 |
| 002 | 1500<br>1900 | 1130<br>1300 | 80<br>130 | ⟵ 320 |

FIG. 3

VITAL PRODUCT DATA 145

SYSTEM TYPE 405

PROCESSOR CHARACTERIZATION DATA 410

| FREQUENCY (425) | VOLTAGE (430) | CURRENT (435) |
|---|---|---|
| 1500 | 1100 | 88 | ⟵ 415 |
| 1900 | 1320 | 124 | ⟵ 420 |

FIG. 4

PROCESSOR ENVIRONMENT TABLE (VID BY VOLTAGE AND CURRENT) 275

| | \<- VOLTAGE -\> | | | |
|---|---|---|---|---|
| 510 → | 1080 | 1090 | 1100 | 1110 ← 505 |
| 84 | 0X25 | 0X26 | 0X27 | 0X28 |
| 86 | 0X25 | 0X26 | 0X27 | 0X28 |
| CURRENT 88 | 0X25 | 0X26 | 0X27 | 0X28 |
| 90 | 0X25 | 0X26 | 0X27 | 0X28 |
| 92 | 0X25 | 0X26 | 0X27 | 0X28 |
| 94 | 0X25 | 0X26 | 0X27 | 0X28 |

FIG. 5A

UPDATED PROCESSOR ENVIRONMENT TABLE (VID BY VOLTAGE AND CURRENT) 285

| | \<- VOLTAGE -\> | | | |
|---|---|---|---|---|
| | 1080 | 1090 | 1100 | 1110 |
| 84 | 0X25 | 0X26 | 0X27 | 0X28 |
| 86 | 0X25 | 0X26 | 0X27 | 0X28 |
| CURRENT 88 | 0X25 | 0X26 | 0X28 | 0X28 |
| 90 | 0X25 | 0X26 | 0X27 | 0X28 |
| 92 | 0X25 | 0X26 | 0X27 | 0X28 |
| 94 | 0X25 | 0X26 | 0X27 | 0X28 |

SUPPLYING COMBINATIONS OF CLOCK FREQUENCY, VOLTAGE, AND CURRENT TO PROCESSORS

FIELD

An embodiment of the invention generally relates to computer processors and more specifically relates to control of processors via combinations of operating clock frequency, voltage amount, and current amount.

BACKGROUND

Computer systems include a combination of interconnected parts, such as racks or cabinets, circuit boards, power supplies, memory, storage devices, cables, and processors. Processors are the part of the computer system that execute instructions and control the operations of the computer system. Processors are typically fabricated in a multi-step sequence of photographic and chemical processing steps during which electronic circuits are gradually layered on a wafer made of semiconducting material. This fabrication process typically takes weeks to perform. Each processor is then tested using automated test equipment, in a process known as wafer testing, in order to determine if the processor functions properly. The wafer is then cut into small rectangles called dice. Each die that passes the tests is then connected into a package. After packaging, the processors are retested. The proportion of processors on the wafer found to perform properly is called the yield.

Because of the lengthy fabrication process and the expense of the semiconducting materials, a low yield is particularly wasteful of time and money, so manufacturers are naturally interested in techniques to increase processor yield. One technique for increasing yield is to test the processors at a variety of combinations of voltages, currents, and clock frequencies. A processor that fails a test at one combination might pass all tests at another combination, and thus still be usable, so long as the processor is subsequently operated with the successful combination. For example, a processor might draw too much current at one clock frequency and voltage, causing it to become too hot and thus fail a test. But, if the voltage is lowered, the current draw also decreases and if the processor is still fully functional (perhaps at the same or a different clock frequency), it can pass the test.

While this technique has the advantage of increasing processor yield, it has the disadvantage that every processor potentially has a different set of successfully-tested combinations of voltage, current, and clock frequency. The computer system in which a specific processor is subsequently installed must know the specific successfully-tested combinations for its specific processor, so that the computer system can supply the successfully-tested voltage and operate the processor at the successfully-tested clock frequency. Also, the installer of the processor into the computer system must know the successfully-tested combinations, so that the installer can install the processor into a compatible computer system and inform the computer system of the combinations. Typically, these various combinations are handled by assigning different part numbers (or model or type numbers) to processors that have different successfully-tested combinations of voltage, current, and clock frequency, even though the design of the processors is exactly the same. These part numbers are often printed on the surface of the processor, and each unique part number needs a unique storage bin or container in an assembly area where parts are stored prior to installation in a computer system. Thus, a side effect of increasing processor yield by varying combinations of voltage, current, and clock frequency is the proliferation of part numbers and the proliferation of storage bins, which becomes difficult to manage.

Another disadvantage is that the operating environment of the computer system in which the processor is eventually installed may be different from the environment of the test station in which the successfully-tested combinations were determined. For example, the temperature, system workload, distribution drop, voltage sense point, regulator differences, or amount of voltage interference from nearby components may be different, which may cause the previously-determined combinations to no longer be correct.

Thus, what is needed is a better technique for managing the combinations of voltage, current, and clock frequency at which a processor needs to operate.

SUMMARY

A method, apparatus, system, and computer-readable storage medium are provided. In an embodiment, combinations of clock frequencies, voltage amounts, and current amounts at which a processor operates normally are determined via testing. These combinations are stored to a component on which the processor is installed. Voltage identifiers are stored to a computer system in which the component is installed. The voltage identifiers are associated with combinations of the voltage amounts and the current amounts. In an embodiment, the voltage identifiers may be subsequently changed in response to measurements in the computer system. A type of the computer system is also stored to the component. A first clock frequency at which the processor operates is determined that is assigned to the type of the computer system. A first voltage amount and a first current amount are selected that are assigned to the first clock frequency. A first voltage identifier is found that is assigned to the combination of the first voltage amount and the first current amount, and the first voltage identifier is sent to a voltage regulator, which selects a second voltage amount based on the first voltage identifier and supplies the second voltage amount to the processor. In various embodiments, the second voltage amount may be the same as, or different from, the first voltage amount. In this way, in an embodiment, processors may operate at a variety of combinations of clock frequencies, voltage amounts, and current amounts without the necessity of multiple part numbers, and the voltage supplied to the processor may be adjusted subsequent to installation.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a test station tests a processor with various combinations of clock frequencies, voltage amounts, and current amounts and determines the successfully-tested combinations at which the processor operates normally. The processor is installed to a component, and these successfully-tested combinations are stored to the same component. The component is installed to a computer system, and voltage identifiers are also stored to the computer system. The voltage identifiers identify various combinations of voltage amounts and current amounts. A type of the computer system is also stored to the component.

A controller in the computer system reads the type of the computer system from the component and determines a first clock frequency (at which the processor operates) that is assigned to that type. The controller selects a first voltage amount and a first current amount that are assigned to the first clock frequency from the successfully-tested combinations. The controller finds a first voltage identifier that is assigned to the combination of the first voltage amount and the first current amount, and the controller sends the first voltage identifier to a voltage regulator, which selects a second voltage amount based on the first voltage identifier and supplies the second voltage amount to the processor.

Measurements of the computer system are taken, such as the current drawn by the processor or the temperature of the processor (among others), and some of the voltage identifiers in the computer system may be updated in response to these measurements. If the first voltage identifier was updated, then the second voltage amount that the voltage regulator supplies to the processor is different from the first voltage amount that the controller determined from the successfully-tested combinations. On the other hand, if the first voltage identifier was not updated, then the second voltage amount is the same as the first voltage amount. In this way, in an embodiment, processors may operate at a variety of combinations of clock frequencies, voltage amounts, and current amounts without the necessity of multiple part numbers, and the voltage supplied to the processor may be adjusted subsequent to installation.

Figure 1:
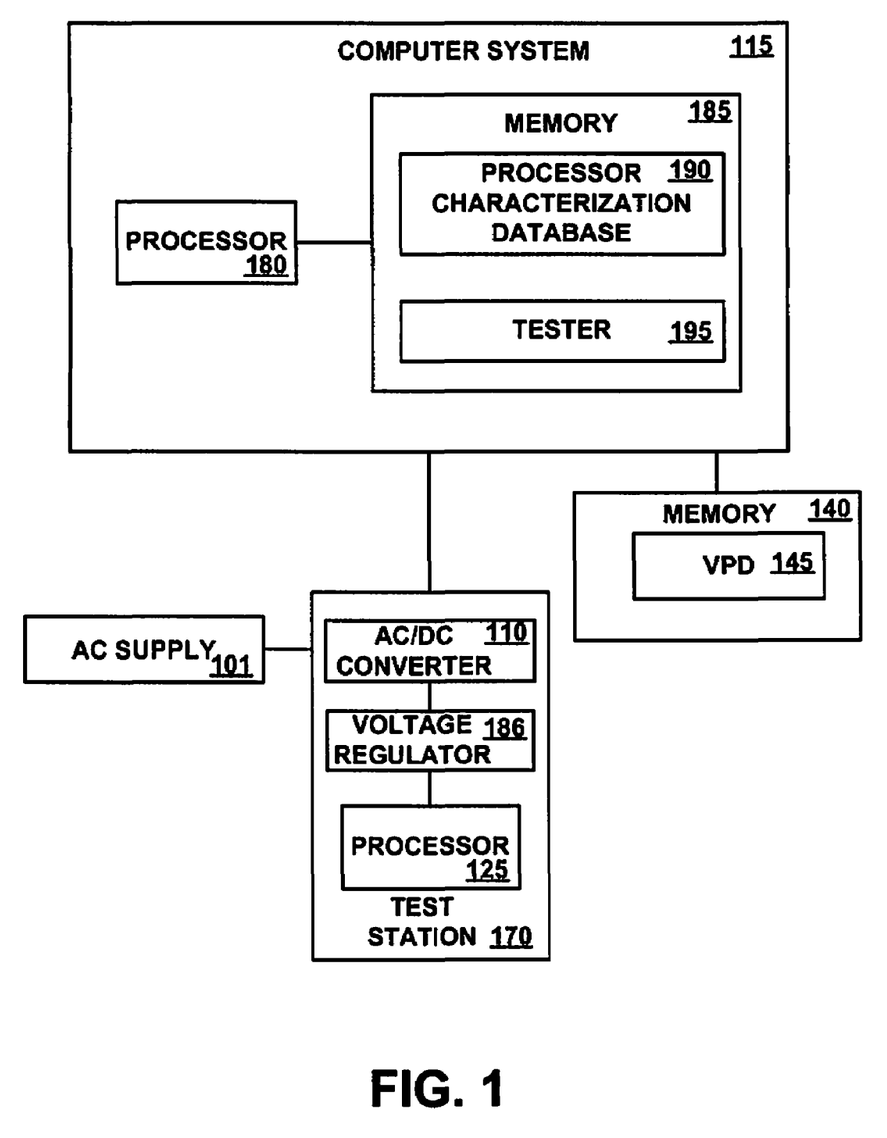
FIG. 1 depicts a high-level block diagram of an example system for implementing an embodiment of the invention.

Referring to the Drawings, wherein like numbers denote like parts throughout the several views, FIG. 1 depicts a high-level block diagram representation of major elements of a computer system 115 connected to a test station 170 and memory 140. The test station 170 is further connected to an AC (alternating current) supply 101.

In various embodiments, the computer system 115 may be a multi-user system, a single user system, or a server or similar device which has little or no direct user interface, but receives requests from other computer systems (clients). In other embodiments, the computer system 115 may be implemented as a personal computer, portable computer, laptop or notebook computer, PDA (Personal Digital Assistant), tablet computer, pocket computer, appliance, or any other appropriate type of electronic device.

The computer system 115 includes a processor 180 connected via a bus to memory 185. The processor 180 is a central processing unit capable of executing instructions. The memory 185 is a random-access semiconductor memory for storing or encoding data and/or programs. The memory 185 stores a processor characterization database 190 and a tester 195. Although the processor characterization database 190 and the tester 195 are illustrated as being stored in the memory 185 in the computer system 115, in other embodiments some or both may be on different computer systems and may be accessed remotely. The computer system 115 may use virtual addressing mechanisms that allow the software of the computer system 115 to behave as if it only has access to a large, single storage entity instead of access to multiple, smaller storage entities. Thus, while the processor characterization database 190 and the tester 195 are illustrated as residing in the memory 185, these elements are not necessarily all completely contained in the same storage device at the same time.

In an embodiment, the tester 195 includes instructions capable of executing on the processor 180 or statements capable of being interpreted by instructions executing on the processor 180 to perform the processing as further described below with reference to FIG. 6. In another embodiment, the tester 195 may be implemented in microcode. In another embodiment, the tester 195 may be implemented in hardware via logic gates and/or other appropriate hardware techniques in lieu of, or in addition to, a processor-based system.

The test station 170 includes an AC/DC converter 110 connected to a voltage regulator 186, which is connected to the processor 125. Although the test station 170 is illustrated as being separate from the computer system 115, in another embodiment, they may be combined. The test station 170 is connected to the AC supply 101, and the AC/DC converter 110 receives alternating electrical current from the AC supply 101 and supplies direct current to the voltage regulator 186. The voltage regulator 186 supplies voltage to the processor 125 and regulates the amount of voltage. The voltage regulator 186 is capable of supplying different amounts of voltage to the processor 125 in response to commands.

The processor 125 is a central processing unit capable of executing instructions and may include one or more levels of cache. The processor 125 receives direct electrical current from the voltage regulator 186 at a variety of combinations of voltages and operates at a variety of clock frequencies.

The memory 140 is a random access semiconductor memory and stores the vital product data 145, which the memory 140 receives from the computer system 115. The vital product data 145 describes successfully-tested combinations of voltage amounts, current amounts, and clock frequencies for the processor 125. The vital product data 145 is further described below with reference to FIG. 4.

The tester 195 sends commands to the test station 170 that include combinations of voltage amount, current amount, and clock frequency. The voltage regulator 186 receives the commands and supplies the requested voltage amount to the processor 125, which is being tested. The test station 170 further instructs the processor 125 to operate at the clock frequency received from the tester 195. The test station 170 further provides a variety of inputs to the processor 125, in order to test different functions of the processor 125 and to run different tests. The test station 170 collects information regarding the results of the tests, such as the output of the processor 125, and returns those results to the tester 195. The tester 195 collects the results of the tests that the test station 170 performs on the processor 125 while supplying the various voltage amounts, current amounts, and clock frequencies. The tester 195 determines which of the tests were successful and which had errors and associates the results of the tests with their corresponding combinations of voltage amount, current amount, and clock frequency. The tester 195 stores the successful combinations of voltage amount, current amount, and clock frequency at which the processor 125 operated normally without error for all tests in the processor characterization database 190, which is further described below with reference to FIG. 3. The tester 195 stores the successful combinations of voltage amount, current amount, and clock frequency at which the processor 125 operated normally without error for all tests to the vital product data 145 that is associated with that particular processor 125. Thus, each processor tested in the test station 170 has its own vital product data 145.

Figure 2:
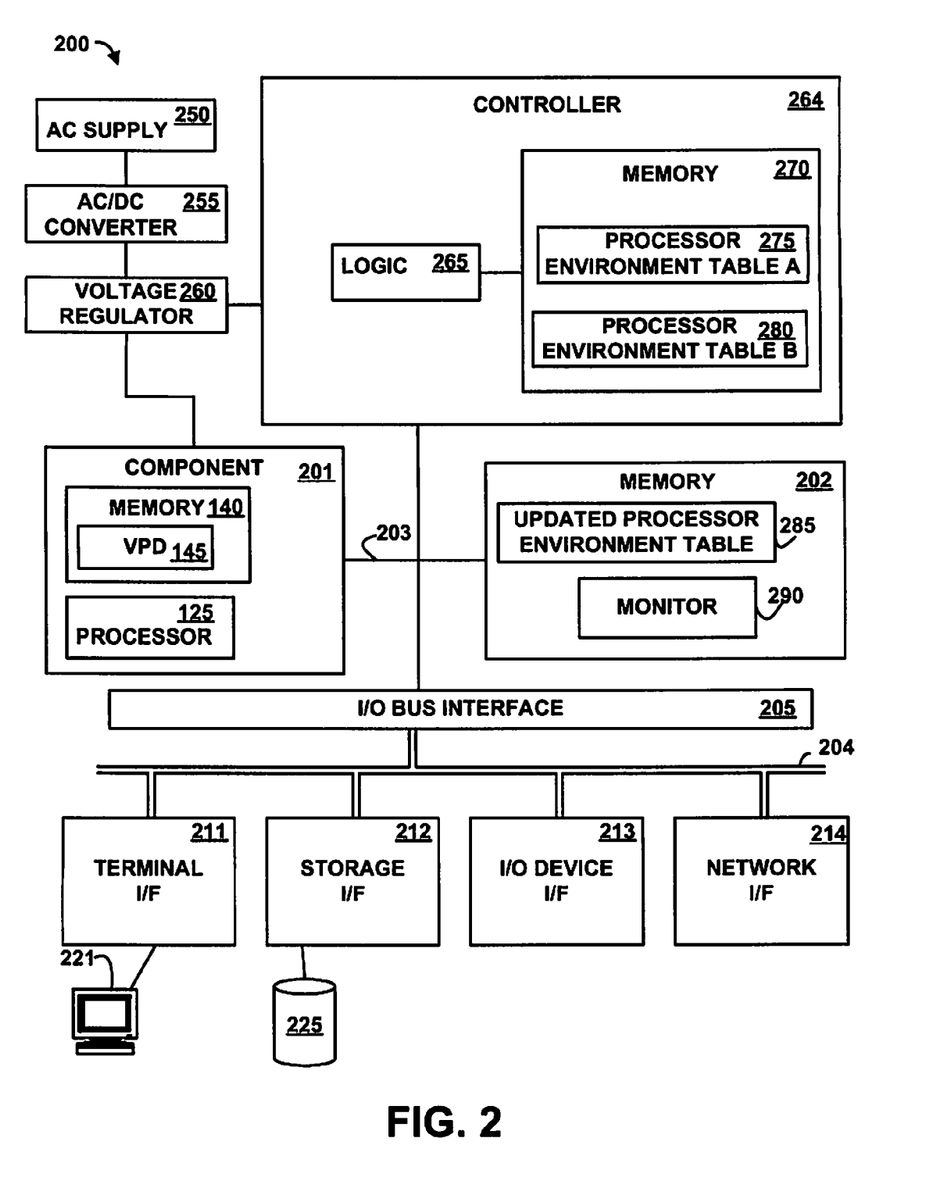
FIG. 2 depicts a high-level block diagram of another example system for implementing an embodiment of the invention.

FIG. 2 depicts a high-level block diagram of an example computer system 200 for implementing an embodiment of the invention. The major elements of the computer system 200 include a component 201, a main memory 202, a terminal interface 211, a storage interface 212, an I/O (Input/Output) device interface 213, a network interface 214, and a controller 264, all of which are coupled for inter-component communication via a memory bus 203, an I/O bus 204, and an I/O bus interface unit 205.

The component 201 is connected to the memory bus 203 and a voltage regulator 260. In various embodiments, the component 201 is a field replaceable unit, a hardware part, a board, a card, an electronic device, or any other component capable of mounting a processor 125. The component 201 includes the memory 140, which stores the vital product data 145, and the processor 125. The processor 125 and the memory 140 were installed on the component 201 subsequent to testing, as previously described above with reference to FIG. 1. In another embodiment, the testing of FIG. 1 may be performed while the processor is installed on the component 201 and/or while the component is installed within the computer system 200.

The voltage regulator 260 is connected to and receives direct electrical current from an AC/DC (alternating current/direct current) converter 255. The voltage regulator 260 is further connected to the controller 264. The voltage regulator 260 supplies direct electrical current to the component 201, including the processor 125. The voltage regulator 260 is capable of supplying direct current at a variety of voltages and sets its output voltage in response to a voltage identifier (VID) signal that the voltage regulator 260 receives from the controller 264. In various embodiments, the voltage regulator 260 may be implemented as a shunt regulator, an active regulator, a linear regulator, a switching regulator, an SCR regulator (Silicon Controlled Rectifier), a hybrid regulator, any other appropriate regulator, or any multiple or combination thereof. The AC/DC converter 255 supplies direct current to the voltage regulator 260. The AC/DC converter 255 is connected to and receives alternating current from an AC supply 250.

The controller 264 is connected to the voltage regulator 260 and the memory bus 203. The controller 264 may be implemented as a card, board, processor and memory, or any other appropriate electronic device. The controller 264 includes logic 265 connected to a semiconductor memory 270, which stores processor environment tables 275 and 280. The logic 265 may be implemented via hardware logic gates or via a processor and memory encoded with instructions that execute on the processor. The logic 265 reads information from the processor environment tables 275 and/or 280, determines a combination of voltage amount, current amount, and clock frequency, and sends a VID signal to the voltage regulator 260, which instructs the voltage regulator 260 to supply the determined voltage amount to the processor 125. The logic 265 further instructs the processor 125 to operate at the determined clock frequency. The processing of the controller 264 is further described below with reference to FIGS. 7A and 7B.

The processor environment tables 275 and 280 encode VID settings for different types, classes, models, or categories to which the computer system 200 belongs. Any number of the processor environment tables may be present, so that the controller 264 may be installed on any type, class, model, or category of computer system 200 and still operate correctly. The controller 264 determines the type, class, model, or category of the computer system 200 in which it is installed and then selects the appropriate processor environment table 275 or 280 based on and corresponding to the determined type, class, model, or category. The processor environment tables are further described below with reference to FIG. 5A. Although the processor environment tables 275 and 280 are illustrated as being separate, in another embodiment, they may be combined. Although both the processor environment tables 275 and 280 are illustrated as being encoded in the memory 270, they are not necessary contained with the same storage device at the same time.

The main memory 202 is a random-access semiconductor memory for storing or encoding data and/or programs. The main memory 202 stores or encodes an updated processor environment table 285 and a monitor 290.

The updated processor environment table 285 includes changes to the processor environment table 275 or 280, which the monitor 290 may send to the controller 264, which overwrites the values in the corresponding processor environment table 275 or 280 with the values in the updated processor environment table 285. In an embodiment, the monitor 290 includes instructions capable of executing on the processor 125 or statements capable of being interpreted by instructions executing on the processor 125 to perform the functions as further described below with reference to FIG. 7B. In another embodiment, the monitor 290 may be implemented in microcode. In another embodiment, the monitor 290 may be implemented in hardware via logic gates and/or other appropriate hardware techniques.

The memory bus 203 provides a data communication path for transferring data among the processor 125, the main memory 202, and the I/O bus interface unit 205. The I/O bus interface unit 205 is further coupled to the system I/O bus 204 for transferring data to and from the various I/O units. The I/O bus interface unit 205 communicates with multiple I/O interface units 211, 212, 213, and 214, which are also known as I/O processors (IOPs) or I/O adapters (IOAs), through the system I/O bus 204. The system I/O bus 204 may be, e.g., an industry standard PCI (Peripheral Component Interconnect) bus, or any other appropriate bus technology. The I/O interface units support communication with a variety of storage and I/O devices.

Although the memory bus 203 is shown in FIG. 2 as a relatively simple, single bus structure providing a direct communication path among the component 201, the main memory 202, the I/O bus interface 205, and the controller 264, in another embodiment the memory bus 203 may comprise multiple different buses or communication paths, which may be arranged in any of various forms, such as point-topoint links in hierarchical, star or web configurations, multiple hierarchical buses, parallel and redundant paths, etc. Furthermore, while the I/O bus interface 205 and the I/O bus 204 are shown as single respective units, in other embodiments the computer system 200 may contain multiple I/O bus interface units 205 and/or multiple I/O buses 204. While multiple I/O interface units are shown, which separate the system I/O bus 204 from various communications paths running to the various I/O devices, in other embodiments some or all of the I/O devices are connected directly to one or more system I/O buses.

The terminal interface unit 211 supports the attachment of one or more user terminals 221, which may include any number and type of user input/output devices, such as keyboards, video display terminals, speakers, pointing devices (e.g., a mouse, trackball, or trackpad), or microphones. The storage interface unit 212 supports the attachment of one or more direct access storage devices (DASD) 225, which are typically rotating magnetic disk drive storage devices, although they could alternatively be other devices, including arrays of disk drives configured to appear as a single large storage device to a host. The I/O and other device interface 213 provides an interface to any of various other input/output devices or devices of other types, such as a printer, fax machine, or other devices. The network interface 214 provides one or more communications paths from the computer system 200 to other digital electronic devices and computer systems.

The computer system 200 is not limited to a system of any size or type. In various embodiments, the computer system 200 may be a multi-user "mainframe" computer system, a single-user system, typically containing only a single user display and keyboard input, or might be a server or similar device that has little or no direct user interface, but receives requests from other computer systems (clients). In other embodiments, the computer system 200 may be implemented as a personal computer, portable computer, laptop or notebook computer, PDA (Personal Digital Assistant), tablet computer, pocket computer, telephone, pager, automobile, teleconferencing system, video recorder, camcorder, audio recorder, audio player, stereo system, MP3 (MPEG Audio Layer 3) player, digital camera, navigation system, appliance, or any other appropriate type of electronic device.

It should be understood that FIGS. 1 and 2 are intended to depict the representative major elements of the computer system 115, the test station 170, and the computer system 200 at a high level, that individual elements may have greater complexity than that represented in FIGS. 1 and 2, that elements other than, instead of, or in addition to those shown in FIGS. 1 and 2 may be present, and that the number, type, and configuration of such elements may vary. Several particular examples of such additional complexity or additional variations are disclosed herein; it being understood that these are by way of example only and are not necessarily the only such variations.

The various software elements illustrated in FIGS. 1 and 2 and implementing various embodiments of the invention may be implemented in a number of manners, including using various computer software applications, routines, components, programs, objects, modules, data structures, etc., referred to hereinafter as "computer programs." The computer programs typically comprise one or more instructions that are resident at various times in various memory and storage devices in the computer system 115, the test station 170, and the computer system 200, and that, when read and executed by one or more processors in the computer system 115, the test station 170, and the computer system 200, cause the computer system 115, the test station 170, and the computer system 200 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 115, the test station 170, and/or the computer system 200 via a variety of tangible signal-bearing computer-readable media, which include, but are not limited to:

(1) information permanently stored on a non-rewriteable storage medium, e.g., a read-only memory device attached to or within a computer system, such as CD-ROM, DVD-R, or DVD+R;

(2) alterable information stored on a rewriteable storage medium, e.g., a hard disk drive (e.g., DASD 225, the memory 185, 202 or 270), a CD-RW, CD-RW, DVD-RW, DVD+RW, DVD-RAM, or diskette;

(3) information conveyed by a communications medium, such as through a computer or a telephone network, e.g., via the network interface 214, including wireless communications.

Such tangible signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

Figure 3:
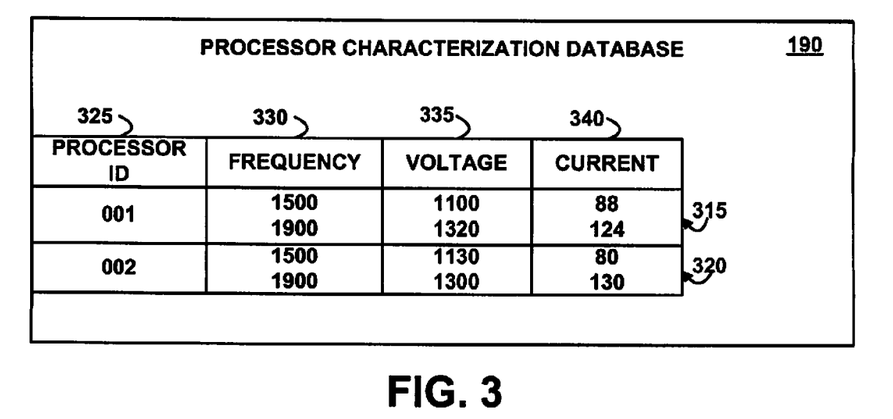
FIG. 3 depicts a block diagram of an example processor characterization database, according to an embodiment of the invention.

FIG. 3 depicts a block diagram of an example processor characterization database 190, according to an embodiment of the invention. The processor characterization database 190 includes records 315 and 320, each of which includes a combination of a processor identifier field 325, a clock frequency field 330, a voltage amount field 335, and a current amount field 340. Each of the records 315 and 320 is associated with a particular processor 125 identified by the processor identifier field 325 and represents the combination of clock frequencies 330, voltage amounts 335, and current amounts 340 at which that particular processor 325 operates normally and without error, as determined by the test station 170 and the tester 195.

The processor identifier field 325 identifies various of the processors 125. The clock frequency field 330 identifies clock rates or clock frequencies at which the processors 125 identified by the processor identifier 325 are capable of operating normally as verified by the testing. The processor 125 uses a synchronization signal, known as a clock signal. In an embodiment, the clock signal takes the form of a periodic square wave, which is created by the frequency of an oscillator crystal. In an embodiment, this clock frequency is expressed in cycles per second and is measured in units of hertz, or multiples of hertz, such as megahertz and is an approximation of the speed of the processor 125, depending on the number of instructions of portions of instructions that the processor 125 executes within a cycle. Thus, all other things being equal, a processor that operates at a lower clock frequency performs slower (executes instructions at a lower rate) than the same processor operating at a higher clock frequency.

The voltage amount field 335 and the current amount field 340 identify the respective amounts of the electrical voltage and electrical current supplied to the processor 125 while the processor 125 was operating normally at the corresponding clock frequency 330. The clock frequency 330, voltage amount 335, and current amount 340 are said to be combinations because they specify values that were successfully tested at the same time. For example, as indicated in record 315, the processor "001" was successfully tested while operating at a clock frequency of "1500" megahertz, receiving "1100" millivolts, and drawing "88" amps. The processor "001" was also successfully tested, as indicated in the record 315, while operating at a clock frequency of "1900" megahertz, receiving "1320" millivolts, and drawing "124" amps. Thus, the processor "001" was successfully tested as operating normally without error at two combinations of clock frequency, voltage amount, and current amount.

Figure 4:
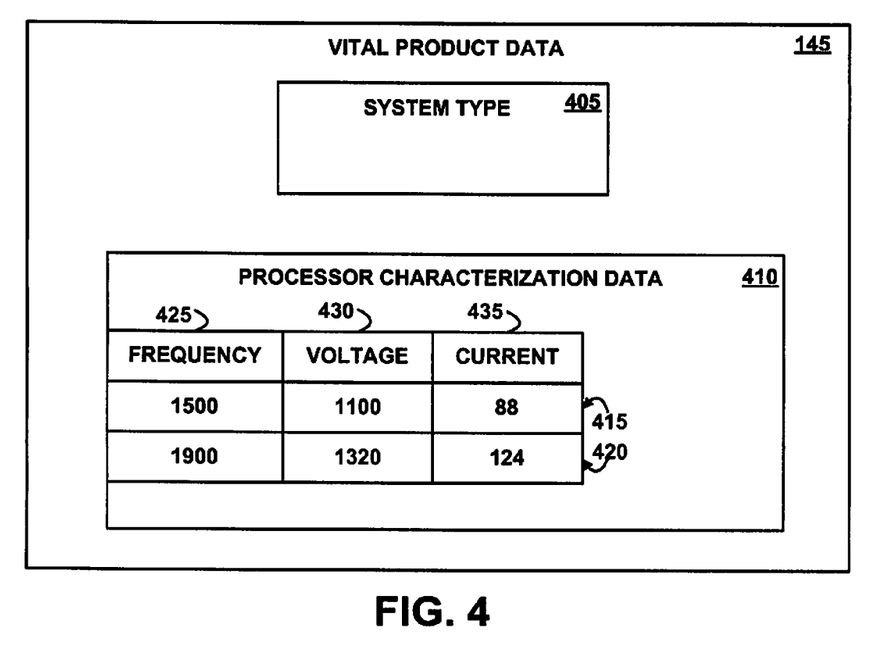
FIG. 4 depicts a block diagram of an example data structure for vital product data, according to an embodiment of the invention.

FIG. 4 depicts a block diagram of an example data structure for the vital product data 145, according to an embodiment of the invention. The vital product data 145 includes a system type 405 and processor characterization data 410. The system type 405 identifies a type, model, class, and/or category to which the computer system 200 (FIG. 2) belongs. The processor 125 that is installed at the computer system 200 having the type 405 is associated with the vital product data 145 and the type 405 by being installed on the same component 201 as the memory 140 that contains the vital product data 145 and the type 405. The processor characterization data 410 includes the record(s) from the processor characterization database 190 that have a processor identifier 325 (FIG. 3) that identifies the processor 125 that is installed in the computer system 200. If a computer system 200 has more than one processor installed, than it may have more than one set of processor characterization data 410 and may also have more than one set of vital product data 145.

In the example of FIG. 4, the processor characterization data 410 includes records 415 and 420, each of which includes a clock frequency field 425, a voltage amount field 430, and a current amount field 435. The records 415 and 420 include the data from the record 315 of the processor characterization database 190, which in this example represents the processor 125 that is installed at the computer system 200. The processor 125 may operate at a different clock frequencies; thus, the processor characterization data 410 contains records 415 and 420 for multiple clock frequencies and multiple combinations of clock frequency, voltage amount, and current amount. In embodiment, the computer system 200 chooses the clock frequency 425 at which to operate the processor 125 based on, and in response to, the value in the system type 405. For example, if the system type 405 indicates that the computer system 200 is a mainframe computer, the computer system 200 chooses to operate the processor 125 at a higher clock frequency; but, if the system type 405 indicates that the computer system 200 is PDA (Personal Digital Assistant), the computer system 200 chooses to operate the processor 125 at a lower clock frequency.

Figure 5A:
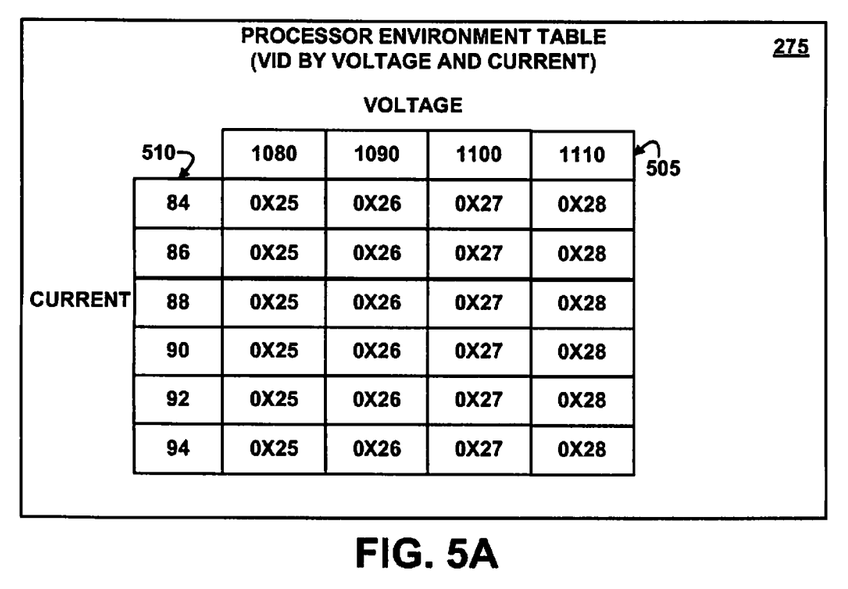
FIG. 5A depicts a block diagram of an example data structure for a processor environment table, according to an embodiment of the invention.

FIG. 5A depicts a block diagram of an example data structure for a processor environment table 275, according to an embodiment of the invention. The processor environment table 275 includes voltage identifiers indexed by voltage amount 505 and current amount 510. That is, each voltage identifier in the cells of the processor environment table 275 is associated with or assigned to a combination of a respective voltage amount and a current amount. For example, as illustrated in FIG. 5A, the voltage value of "1100" in combination with the current value of "88" has an assigned voltage identifier (VID) of "0x27." As another example, the voltage value of "1080" in combination with the electrical current value of "84" has an assigned voltage identifier (VID) of "0x25."

The controller 264 uses the voltage amount 430 and the current amount 435 assigned to the clock frequency 425 from the processor characterization data 410 as indexes into the processor environment table 275 that is assigned to the system type 405 of the computer system 100, in order to determine the VID that is assigned to the voltage 430 and the current 435 for the clock frequency at which the processor 125 that is installed in the computer system 200 operates. For example, if the processor 125 that is installed in the computer system 200 is operating at a clock frequency 425 of "1500" (record 415), then the voltage amount 430 is "1100" and the current amount 435 is "88," and the VID assigned to the voltage 505 of "1100" and a current 510 of "88" is "0x27," as indicated in the processor environment table 275. Thus, the controller 264 sends the VID of "0x27" to the voltage regulator 260 because the VID of "0x27" corresponds to the clock frequency at which the processor 125 is operating and to the voltage and current that were tested and found successful for that clock frequency.

Although only the processor environment table 275 is illustrated as an example in FIG. 5A, the processor environment table 280 may have some of the same values, all of the same values, or completely different values.

Figure 5B:
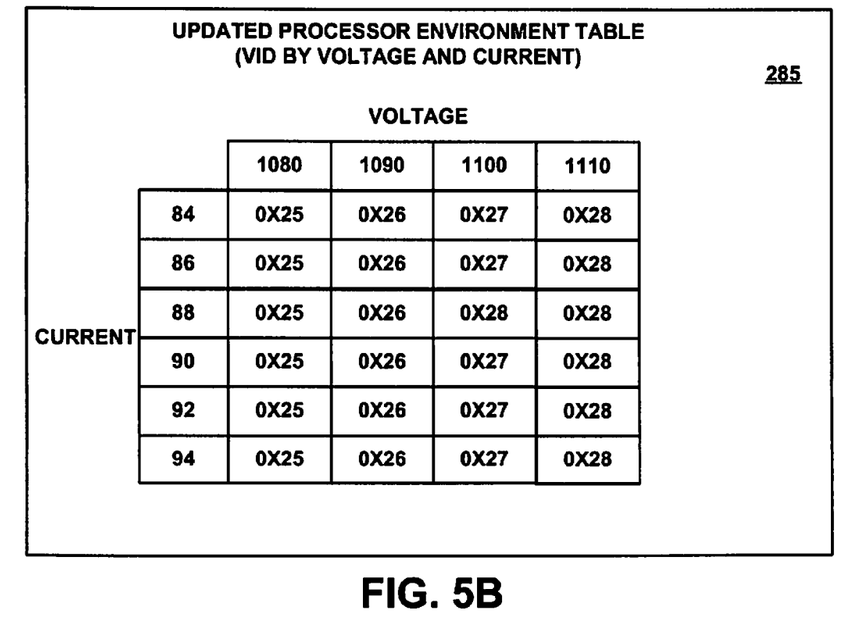
FIG. 5B depicts a block diagram of an example data structure for an updated processor environment table, according to an embodiment of the invention.

FIG. 5B depicts a block diagram of an example data structure for an updated processor environment table 285, according to an embodiment of the invention. If the combinations of clock frequency, voltage, and current for the processor 125 need to be changed, the monitor 290 sends the updated processor environment table 285 to the controller 264, which replaces the values in the corresponding processor environment table 275 or 280 with the values in the updated processor environment table 285. One or more of the voltage identifier values in the updated processor environment table 285 are changed from the processor environment table 275. In the example shown, the value of the voltage identifier "0x28" that is assigned to the voltage amount of "1100" and current "88" is changed from the value of "0x27" that previously was assigned to the same voltage amount and current amount in the processor environment table 275.

If the environment of the test station 170 is identical to the environment of the computer system 200, then the controller 264 uses the VID values in the processor environment table 275 or 280 to set the voltage regulator's VID, so that the voltage supplied to the processor 125 matches the voltage specified by a record of the processor characterization data 410 of the VPD (hence the current matches, also). In actual practice, the environment of the computer system 200 is often different from the environment of the test station 170. The environment may be different because of a variety of factors, such as differences in the temperature of the processor 125, differences in the distribution drop, differences in the ripple voltage, differences in the location of the voltage set point, different voltage regulators 186 and 260, or differences in the workload executed by the processor 125 in the computer system 200 from the testcases executed by the processor 125 in the test station 170. The distribution drop is the voltage drop between a sense point, such as at a back plane, and the processor 125. The ripple voltage is the super-imposed alternating component of the output of the AC/DC converter 255 and/or the voltage regulator 260. The current drawn by the processor 125 can be affected by (and be a function of) any, some, or all of these factors.

In order to respond to the environmental changes, the updated processor environment table 285 is created with one or more VID values that are different from the original VID values in the processor environment table 275 or 280. The updated processor environment table 285 can be modified, in whole or in part from the processor environment table 275 or 280. In another embodiment, the updated processor environment table 285 is created in response to a problem with the processor 125 or an error in the original testing of the processor 125 at the test station 170. The updated processor environment table 285 is sent to the controller 264, which updates the processor environment table 275 or 280 with the updated processor environment table 285. The controller 264 then sends the updated VID values to the voltage regulator 260, in order to change the voltage set point due to the factors listed, which creates an updated voltage set point that is customized for the environment of the particular computer system 200, in which the processor 125 is installed.

Figure 6:
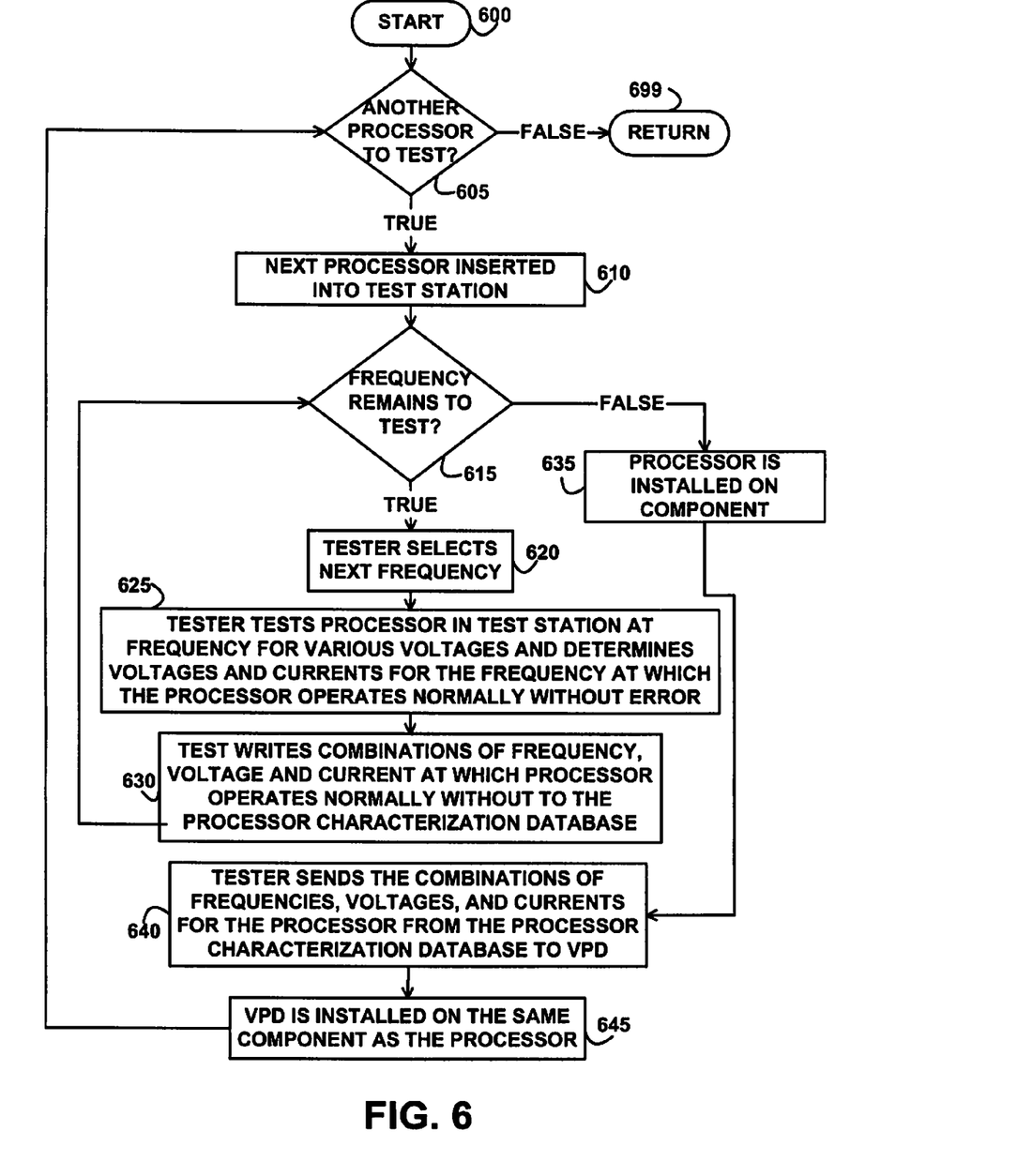
FIG. 6 depicts a flowchart of example logic for creating processor characterization data, according to an embodiment of the invention.

FIG. 6 depicts a flowchart of example logic for creating the processor characterization data, according to an embodiment of the invention. Control begins at block 600. Control then continues to block 605 where the tester 195 determines whether another processor 125 is available to test in the test station 170.

If the determination at block 605 is true, then another processor is available to test, so control continues to block 610 where the next processor is inserted into the test station 170. This next processor is now the current processor 125 under test. Control then continues to block 615 where a loop starts that tests a variety of combinations of clock frequency, voltage amount, and current amount supplied to the processor 125. At block 615, the tester 195 determines whether a clock frequency remains to test (that has not yet been tested by the logic of FIG. 6) for the current processor.

If the determination at block 615 is true, then a clock frequency remains to test for the current processor, so control continues to block 620 where the tester 195 selects the next clock frequency to test. Control then continues to block 625 where the tester 195 tests the current processor in the test station 170 at the selected clock frequency for various voltage amounts and current amounts. The tester 195 further determines the voltage amounts and the current amounts supplied to the processor while operating at the selected clock frequency at which the current processor operates normally without error.

The tester 195 sends signals to the voltage regulator 186 in the test station 170 that direct the voltage regulator 186 to provide or supply a variety of voltage amounts to the current processor, which cause the current processor to draw a corresponding variety of current amounts. The tester 195 further sends instructions to the current processor via the test station 170 that cause the current processor to operate at the clock frequency that was previously selected at block 620. The tester 195 further sends a variety of test case or test inputs that direct the current processor to execute a variety of tests or functions of the processor. The test station 170 may take measurements of the processor, such as a temperature measurement at the processor, a temperature measurement within the test station 170, or the amount of electrical current being drawn by the current processor. The test station 170 further collects output data from the current processor and monitors the operation of the current processor for any errors while operating at the selected clock frequency and while receiving the various voltage amounts and current amounts. The test station 170 sends to the tester 195 the output data, the results of the tests, and/or the measurement data.

Control then continues to block 630 where the tester 195 writes combinations of an identifier 325 of the current processor, the selected clock frequency 330, the voltages 335, and the currents 340 at which the current processor functions normally and without error to the processor characterization database 190. Control then returns to block 615 where the tester 195 determines whether another clock frequency remains to test for the current processor, as previously described above.

If the determination at block 615 is false, then all clock frequencies have been tested by the loop that starts at block 615 for the current processor at the test station 170, so control continues to block 635 where the current processor is installed on the component 201. Control then continues to block 640 where the tester 195 sends the combinations of associated or assigned successfully-tested clock frequencies, voltage amounts, and current amounts for the current processor from the processor characterization database 190 to the processor characterization data 410 in the vital product data 145 in the memory 140. Control then continues to block 645 where the memory 140 containing the vital product data 145 is installed on the same component 201 as the current processor. The testing that is described by the processing of FIG. 6 is now complete for the current processor. Control then returns to block 605, where the tester 195 determines whether another processor is available to test, as previously described above.

If the determination at block 605 is false, then another processor is not available to test in the test station 170, so control continues to block 699 where the logic of FIG. 6 returns.

Figure 7A:
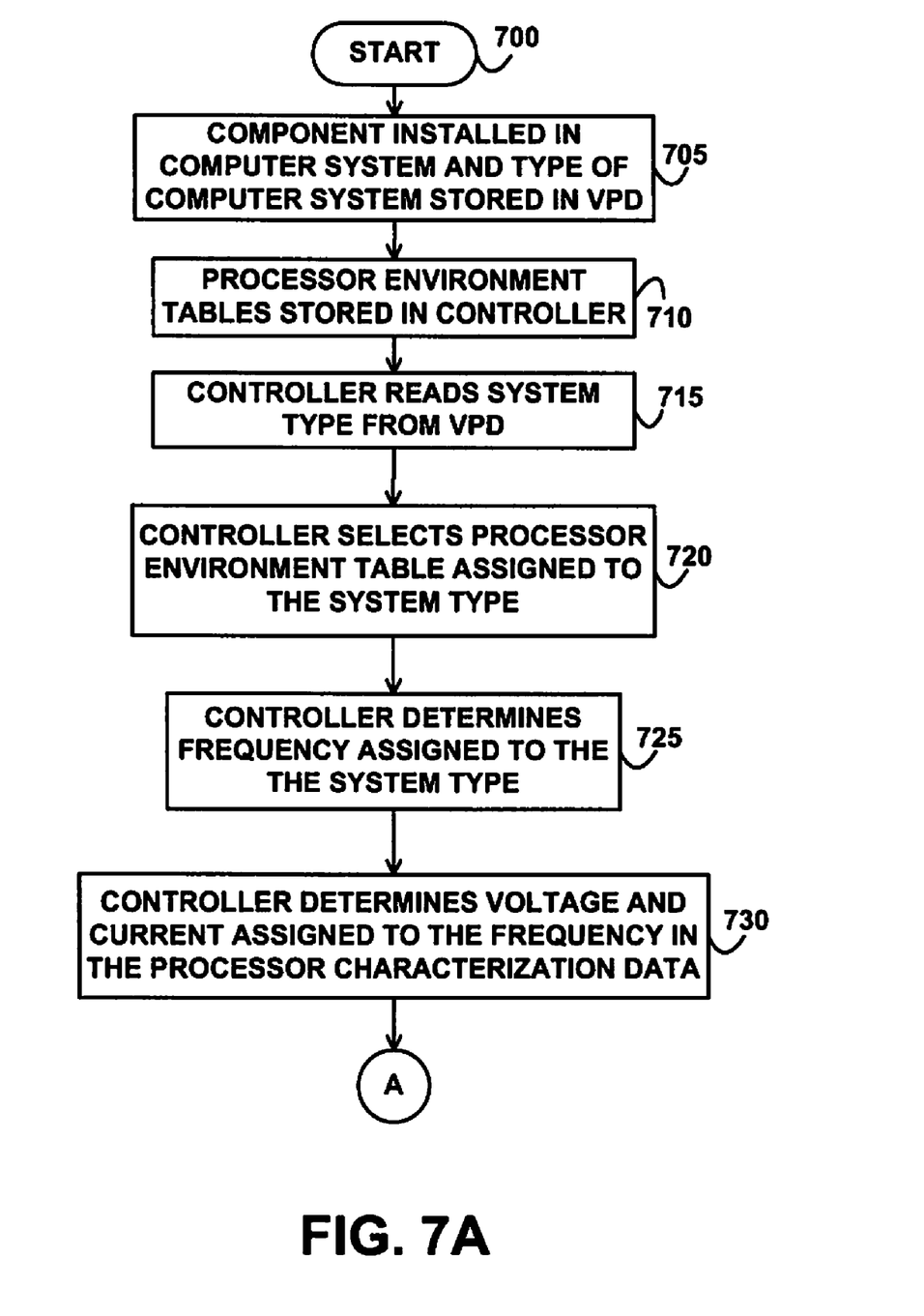
FIG. 7A depicts a flowchart of example logic for regulating processor voltage, according to an embodiment of the invention.
Figure 7B:
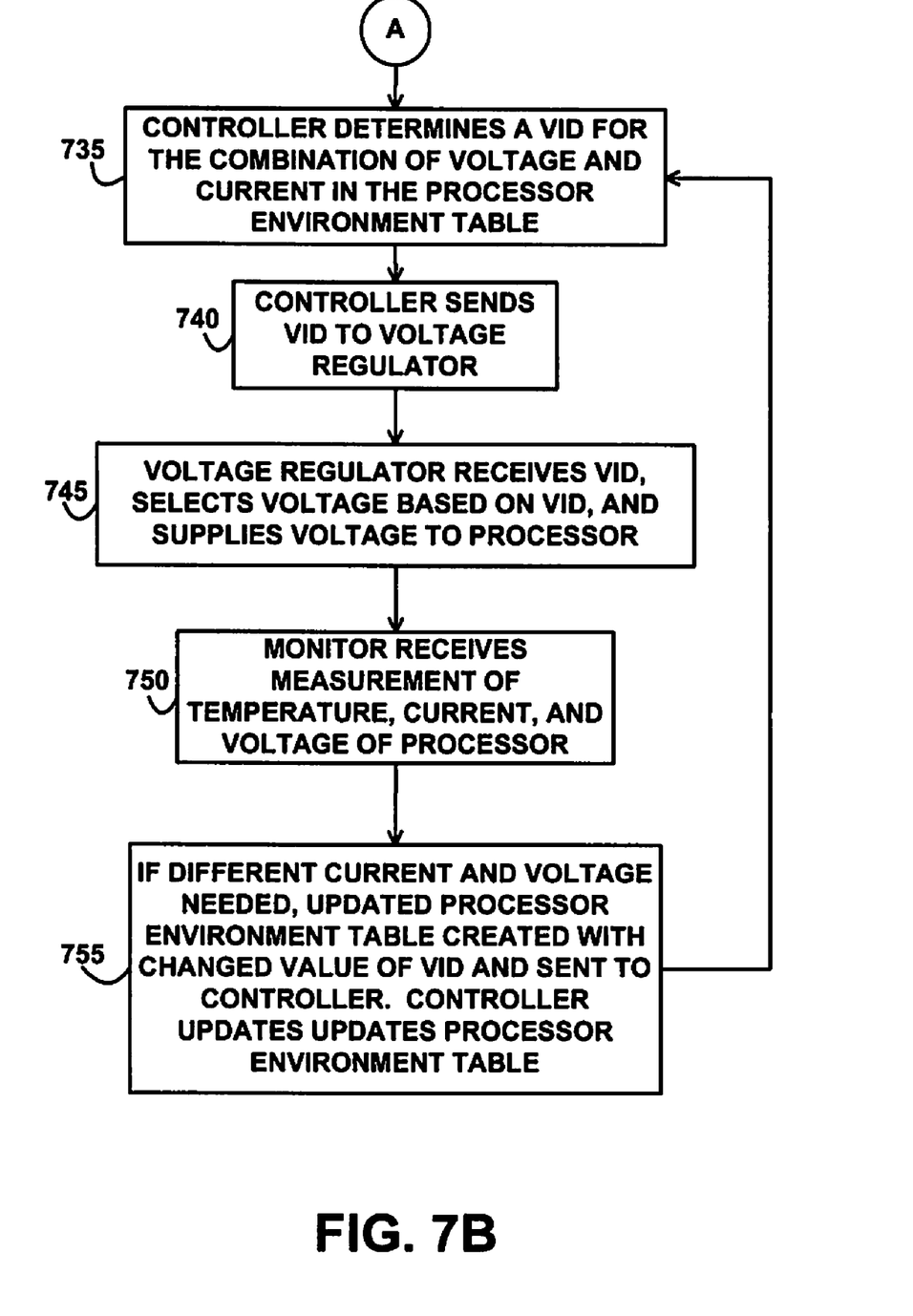
FIG. 7B depicts a flowchart of example logic for further regulating processor voltage, according to an embodiment of the invention.

FIGS. 7A and 7B depict flowcharts of example logic for regulating processor voltage, according to an embodiment of the invention. Control begins at block 700. Control then continues to block 705 where the component 201 is installed in the computer system 200 and the type 405 of the computer system 200 is stored to the vital product data 145 in the memory 140. In various embodiments, the type 405 may be stored to the vital product data 145 by the monitor 290, the tester 195, or by an installation program. Control then continues to block 710 where the processor environment tables 275 and 280 are stored to the memory 270 of the controller 264 by the monitor 290 or an installation program.

Control then continues to block 715 where the controller 264 reads the system type 405 from the vital product data 145 on the component 201, which informs the controller 264 of the type 405 of the computer system 200 at which the controller 264 and the processor 125 on the component 201 are installed. Control then continues to block 720 where the controller 264 selects the processor environment table (from among the multiple processor environment tables 275 and 280) that is assigned to, or is associated with, the type 405 of the computer system 200 at which the controller 264 is installed, as each type 405 may have its own processor environment table 275 or 280. Control then continues to block 725 where the controller 264 determines the clock frequency that is assigned to, or is associated with, the type 405 of the computer system 200. The determined clock frequency is the clock frequency at which the processor 125 operates while installed in the computer system 200. The determined clock frequency is one of the frequencies 425. In an embodiment, a processor 125 may be instructed to operate at different clock frequencies associated with different types 405 of the computer system 200 at which the processor 125 is installed.

Control then continues to block 730 where the controller 264 determines the combination of the voltage amount 430 and the current amount 435 that are assigned to the determined clock frequency 425 by the successful testing of the processor 125, as indicated in the record in the processor characterization data 410 that is associated with the determined clock frequency. Control then continues to block 735 where the controller 264 determines the voltage identifier (VID) that is assigned to or is associated with the combination of the successfully-tested voltage amount and the successfully-tested electrical current amount. In an embodiment, the controller 264 determines the voltage identifier using the combination of the successfully-tested voltage amount 430 and the current amount 435 as indexes 505 and 510 into the processor environment table 275 or 280 to find the corresponding VID in the cell specified by the intersection of the indexes 505 and 510. In various embodiments, the values in the processor environment table 275 or 280 may be the original values or some or all of the values may have been changed or overwritten by values from the updated processor environment table 285.

Control then continues to block 740 where the controller 264 sends the voltage identifier that was previously determined at block 735 to the voltage regulator 260. Control then continues to block 745 where the voltage regulator 260 receives the voltage identifier, selects a voltage amount based on, or that is specified by, the voltage identifier, and supplies the selected voltage to the processor 125. Thus, the VID is a command or a signal, and the voltage regulator 260 selects the voltage amount that it supplies to the processor 125 in response to the value of the VID and supplies different voltage amounts to the processor 125 in response to different VIDs. Thus, if the controller 264 uses the original processor environment table 275 or 280 to find the VID using the combination of the successfully-tested clock frequency, voltage amount, and current amount, then the voltage amount that the voltage regulator 260 supplies to the processor 125 is the same as the successfully-tested voltage amount. But, if the processor environment table 275 or 280 have been overwritten by different values from the updated processor environment table 285, then the voltage amount that the voltage regulator 260 supplies to the processor 125 may be different than the successfully-tested voltage amount because the controller 264 sends a different VID to the voltage regulator 260.

Control then continues to block 750 where the monitor 290 receives a measurement of the temperature (the temperature at the processor 125 or within the computer system 200), the current drawn by the processor 125, and the voltage supplied to processor 125. In other embodiments, the monitor 290 may receive a measurement of the distribution drop or voltage drop between a sense point and the processor 125, and/or the ripple voltage of the output of the AC/DC converter 255 or the voltage regulator 260.

Control then continues to block 755 where an evaluation of the measurements of the temperature of the processor 125, the current drawn by the processor 125, the voltage, the distribution drop, and/or the ripple voltage are done and a determination is made whether a different combination of clock frequency, voltage amount, and current amount is needed, in order for the processor 125 to successfully operate normally without errors. If a different combination is needed because, e.g., the temperature measurement indicates that the processor 125 is too hot or that the processor 125 is drawing too much current, then the updated processor environment table 285 is created with some or all different VID values associated with corresponding voltage and current amounts, and the monitor 290 sends the updated processor environment table 285 to the controller 264. In response to receiving the updated processor environment table 285, the controller 264 selects the processor environment table 275 or 280 that is associated with the computer system 200 at which the controller 264 is installed and overwrites or updates the selected processor environment table 275 or 280 with the values from the updated processor environment table 285.

Control then returns to block 735, as previously described above. Even if the processor environment table 275 or 280 has been updated by the updated processor environment table 285, the processor characterization data 410 is unmodified, so the successfully-tested combinations from the records 415 and 420 are still used as indexes into the processor environment table, but the VIDs in the cells of the processor environment table may have changed, which may cause the controller 264 to supply a different VID to the voltage regulator 260, which may cause the voltage regulator 260 to supply a different voltage to the processor 125. In an embodiment, system monitoring may be done external to the computer system 200 and on a given sample size to determine what and if updates are required to the processor environment tables 275 or 280.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   determining a plurality of combinations of clock frequencies, associated respective voltage amounts, and associated respective current amounts at which a processor operates normally;
   storing the plurality of combinations to a component, wherein the processor is installed on the component and wherein the component is installed in a computer system; and
   storing a plurality of voltage identifiers to the computer system, wherein each of the voltage identifiers is associated with a combination of a respective one of the voltage amounts and one of the current amounts.

2. The method of claim 1, further comprising:
   storing a type of the computer system to the component; and
   determining a first clock frequency that is assigned to the type, wherein the processor operates at the first clock frequency.

3. The method of claim 2, further comprising:
   selecting a first voltage amount and a first current amount that are assigned to the first clock frequency;
   finding a first voltage identifier that is assigned to a combination of the first voltage amount and the first current amount; and
   sending the first voltage identifier to a voltage regulator, wherein the voltage regulator selects a second voltage amount based on the first voltage identifier and supplies the second voltage amount to the processor.

4. The method of claim 3, wherein the second voltage amount comprises the first voltage amount.

5. The method of claim 3, wherein the second voltage amount is different from the first voltage amount.

6. The method of claim 3, further comprising:
   changing a value of the first voltage identifier.

7. The method of claim 6, wherein the changing further comprises:
   changing the value of the first voltage identifier in response to a measurement of a temperature with the computer system.

8. The method of claim 6, wherein the changing the value of the first voltage identifier causes the voltage regulator to change a value of the second voltage amount.

9. A computer-readable storage medium encoded with instructions, wherein the instructions when executed comprise:
   determining a first clock frequency that is associated with a type of a computer system, wherein a processor that operates at the first clock frequency is installed in the computer system;
   selecting a first voltage amount and a first current amount that are associated with the first clock frequency;
   determining a first voltage identifier that is assigned to a combination of the first voltage amount and the first current amount; and
   sending the first voltage identifier to a voltage regulator, wherein the voltage regulator selects a second voltage amount based on the first voltage identifier and supplies the second voltage amount to the processor.

10. The computer-readable storage medium of claim 9, wherein the second voltage amount comprises the first voltage amount.

11. The computer-readable storage medium of claim 9, wherein the second voltage amount is different from the first voltage amount.

12. The computer-readable storage medium of claim 9, further comprising:
    changing a value of the first voltage identifier.

13. The computer-readable storage medium of claim 12, wherein the changing further comprises:
    changing the value of the first voltage identifier in response to a measured current drawn by the processor.

14. The computer-readable storage medium of claim 12, wherein the changing the value of the first voltage identifier causes the voltage regulator to change a value of the second voltage amount.

15. The computer-readable storage medium of claim 9, wherein the determining the first voltage identifier further comprises:
    determining the first voltage identifier from among a plurality of voltage identifiers assigned to a plurality of respective combinations of voltage amounts and current amounts.

16. A computer system comprising:
    a component that comprises a processor and memory, wherein the memory stores a type of the computer system and a plurality of combinations of clock frequencies and associated voltage amounts and current amounts, and wherein the processor operates at a first clock frequency;
    a controller, wherein the controller determines the first clock frequency that is associated with the type of the computer system; wherein the controller selects a first voltage amount and a first current amount that are associated with the first clock frequency and determines a first voltage identifier that is assigned to a combination of the first voltage amount and the first current amount; and
    a voltage regulator connected to the component and the controller, wherein the voltage regulator receives the first voltage identifier from the controller, selects a second voltage amount based on the first voltage identifier, and supplies the second voltage amount to the processor.

17. The computer system of claim 16, wherein the second voltage amount comprises the first voltage amount.

18. The computer system of claim 16, wherein the second voltage amount is different from the first voltage amount.

19. The computer system of claim 16, further comprising:
    a monitor connected to the processor and the controller, wherein the monitor changes a value of the first voltage identifier that is assigned to a combination of the first voltage amount and the first current amount in response to a measurement of a temperature of the processor.

20. The computer system of claim 19, wherein the voltage regulator changes a value of the second voltage amount in response to the change of the value of the first voltage identifier.

* * * * *